United States Patent
Grabowsky et al.

(10) Patent No.: US 8,660,712 B2
(45) Date of Patent: Feb. 25, 2014

(54) RECONFIGURABLE AIRCRAFT

(75) Inventors: John F. Grabowsky, Santa Rosa Valley, CA (US); Timothy E. Conver, Chatsworth, CA (US)

(73) Assignee: AeroVironment Inc., Monrovia, CA (US)

( * ) Notice: Subject to any disclaimer, the term of this patent is extended or adjusted under 35 U.S.C. 154(b) by 493 days.

(21) Appl. No.: 12/804,575

(22) Filed: Jul. 22, 2010

(65) Prior Publication Data

US 2011/0046821 A1    Feb. 24, 2011

Related U.S. Application Data

(60) Provisional application No. 61/271,591, filed on Jul. 22, 2009.

(51) Int. Cl.
*B64C 1/26* (2006.01)
*B64C 3/00* (2006.01)
*B64C 3/26* (2006.01)

(52) U.S. Cl.
USPC ............. 701/3; 244/117 R; 244/120; 244/131

(58) Field of Classification Search
None
See application file for complete search history.

(56) References Cited

U.S. PATENT DOCUMENTS

| | | |
|---|---|---|
| 1,749,769 A | 3/1930 | Johnson |
| 3,640,492 A | 2/1972 | Star |
| 3,935,664 A | 2/1976 | Neuhierl |
| 3,937,424 A | 2/1976 | Meier et al. |
| 3,985,317 A | 10/1976 | Geraci et al. |
| 4,121,791 A | 10/1978 | Taylor et al. |
| 4,494,940 A | 1/1985 | Gretz |
| 4,591,114 A | 5/1986 | Block |
| 5,035,382 A | 7/1991 | Lissaman et al. |

(Continued)

FOREIGN PATENT DOCUMENTS

| | | |
|---|---|---|
| DE | 102006013402 A1 | 9/2007 |
| EP | 1384896 B1 | 1/2004 |

(Continued)

OTHER PUBLICATIONS

"International Search Report and the Written Opinion of the International Search Authority" mailed Sep. 15, 2010, of counterpart PCT application PCT/US10/02092.

(Continued)

*Primary Examiner* — James Trammell
*Assistant Examiner* — Demetra Smith-Stewart
(74) *Attorney, Agent, or Firm* — Eric J. Aagaard, Esq.; The Law Office of John A. Griecci

(57) ABSTRACT

A reconfigurable aircraft having a fuselage and a series of wing segments that form a wing, and an extra wing segment that is interchangeable with a wing segment that is part of the wing. The wing segments are readily attachable and detachable from the fuselage, allowing for the interchanging of the wing segments. At least one of the two interchangeable wing segments is configured with one type of mission-specific equipment, and the other may be configured with a second type of mission-specific equipment, allowing for the quick reconfiguration of the aircraft. Alternatively, the two interchangeable wing segments are each configured with the same mission-specific equipment, allowing for mission-specific equipment is serviced without interfering with the flight schedule. With an additional fuselage and set of wing segments that form a wing a mission may be continuously flown.

14 Claims, 7 Drawing Sheets

(56) References Cited

U.S. PATENT DOCUMENTS

| | | |
|---|---|---|
| 5,810,284 A | 9/1998 | Hibbs et al. |
| 5,975,464 A | 11/1999 | Rutan |
| 6,065,720 A | 5/2000 | Ash et al. |
| 6,619,584 B1 | 9/2003 | Haynes |
| 6,834,835 B1 | 12/2004 | Knowles et al. |
| 7,014,141 B2 | 3/2006 | Cox et al. |
| 7,121,506 B2 | 10/2006 | Clancy |
| 7,234,667 B1 | 6/2007 | Talmage, Jr. |
| 7,237,750 B2 | 7/2007 | Chiu et al. |
| 7,281,681 B2 | 10/2007 | MacCready et al. |
| 7,922,115 B2* | 4/2011 | Colgren et al. ............... 244/13 |
| 2003/0006340 A1 | 1/2003 | Harrison et al. |
| 2004/0211862 A1 | 10/2004 | Elam |
| 2005/0029400 A1 | 2/2005 | Ouellette et al. |
| 2005/0250407 A1 | 11/2005 | Frontera Castaner |
| 2006/0102798 A1* | 5/2006 | Cox et al. ................ 244/190 |
| 2008/0149758 A1 | 6/2008 | Colgren et al. |
| 2011/0001016 A1* | 1/2011 | Skillen et al. ............... 244/218 |
| 2012/0049007 A1* | 3/2012 | Hunter ....................... 244/199.4 |
| 2012/0181857 A1* | 7/2012 | Sechrist ..................... 307/9.1 |

FOREIGN PATENT DOCUMENTS

| | | |
|---|---|---|
| RU | 2231478 C1 | 6/2004 |
| RU | 2291086 C1 | 1/2007 |
| WO | WO 2007/133182 A2 | 11/2007 |

OTHER PUBLICATIONS

"Invitation to Respond to Written Opinion," including a Search Report and Written Opinion, mailed Aug. 20, 2013, by the Intellectual Property Office of Singapore (IPOS), performed by serv.ip, a company of the Austrian Patent Office, dated Feb. 28, 2013, for corresponding Singapore National Stage Application 201202895-7.

* cited by examiner

RECONFIGURABLE AIRCRAFT

This application claims the benefit of U.S. provisional Application No. 61/271,591, filed Jul. 22, 2009, which is incorporated herein by reference for all purposes.

The present invention relates generally to aircraft and, more particularly, to an aircraft having mission-specific interchangeable wing segments.

BACKGROUND OF THE INVENTION

High altitude unmanned aircraft are desirable for a wide variety of operational missions. Such missions include classic intelligence, surveillance, and reconnaissance (ISR), communications and data relay, psychological operations such as TV or radio transmissions to inaccessible locations (PsyOps), reconstituting capability (recovery from a hostile action against a satellite fleet), disaster recovery (such as post-hurricane scenarios that require quick surveillance and communications infrastructure), atmospheric and weather monitoring, anti-satellite weapons (ASAT), electronics intelligence (intelligence derived from the interception of non-communication electromagnetic signals) (ELINT), signals intelligence (intelligence-gathering by the interception of signals) (SIGINT), cameras for strip mapping, or mapping sensors, such as for the National Oceanic and Atmospheric Administration's National Weather Service maps.

Each mission has a unique payload associated with that mission. Typically, such aircraft payloads are in the form of one or more antennas, which can be mounted in various locations on an aircraft, support equipment, which is carried in the fuselage, and extensive wiring that connects the antennas with the support equipment. The support equipment includes various trays, racks and the like, as well as the computers, data processing hardware, data storage units and the like.

The climb to altitude for such aircraft can require a significant amount of fuel, so it is desirable that the aircraft be able to maintain its station (i.e., approximate altitude and location) for a long time. Light weight is therefore advantageous. Nevertheless, such aircraft need the versatility to quickly adapt to the wide variety of missions that they may be required to fill.

Accordingly, there has existed a need for an aircraft that can readily adapt to a wide range of mission requirements, and yet be light enough to maintain station for long periods of time. Preferred embodiments of the present invention satisfy these and other needs, and provide further related advantages.

SUMMARY OF THE INVENTION

In various embodiments, the present invention solves some or all of the needs mentioned above, providing an aircraft that can readily adapt to a wide range of mission requirements, and yet be light enough to maintain station for long periods of time.

In particular, under some embodiments the invention provides a reconfigurable aircraft, including an aircraft fuselage and a plurality of wing segments. The wing segments are readily attachable and detachable from the aircraft fuselage to form a wing. Among the plurality of wing segments, there is one wing-set of wing segments, and at least one additional wing segment. Two wing segments of the plurality of wing segments are interchangeable with one another, and at least one of the two interchangeable wing segments is configured with mission-specific equipment.

Advantageously, this configuration may provide for the interchangeable wing segments to have different mission-specific equipment, or to have mission-specific equipment in one, but not the other, allowing the aircraft to be rapidly reconfigured by simply interchanging the interchangeable wing segments. Alternatively, this configuration may provide for the interchangeable wing segments to have the same mission-specific equipment, allowing the aircraft to be repeatedly flown even while the mission-specific equipment may need to be periodically removed and serviced. Furthermore, with the addition of a second fuselage and wing-set of wing segments, a system is formed that provides for a continuously active mission even while servicing is periodically needed on the mission-specific equipment. Because every configuration carries only the necessary mission-specific equipment, the vehicle weight and fuel costs are minimized, while the flight time can be maximized.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a reconfigurable aircraft system for use with various missions requiring mission-specific payloads (e.g., mission-specific equipment). This system provides for both highly customized aircraft configurations and quick reconfiguration of an aircraft.

Aircraft

Figure 1:
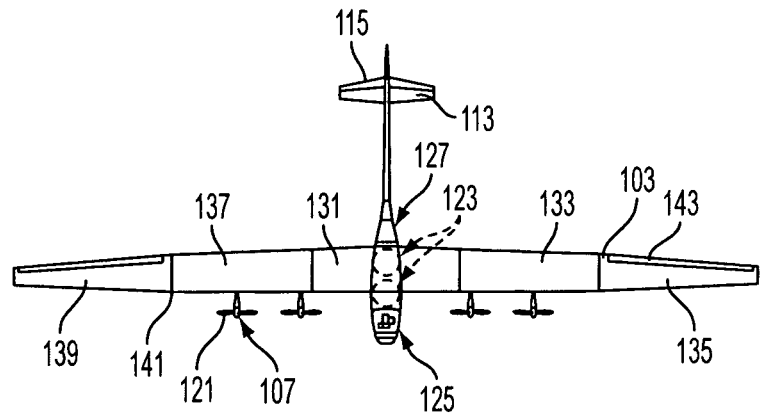
FIG. 1 is a top view of an aircraft embodying the present invention.
Figure 2:
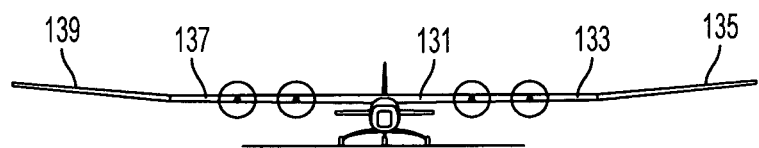
FIG. 2 is a front view of the aircraft depicted in FIG. 1.
Figure 3:
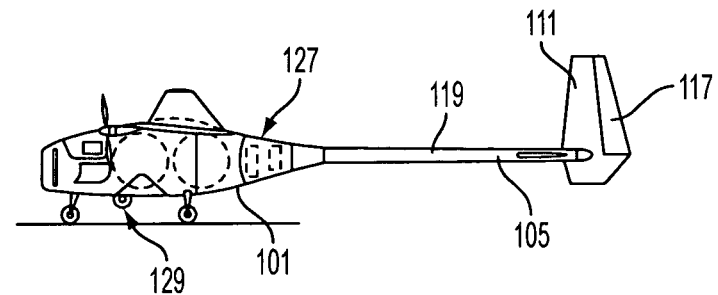
FIG. 3 is a side view of the aircraft depicted in FIG. 1.

With reference to FIGS. 1-3, in basic form the aircraft of this embodiment is intended as a high-altitude, long-endurance unmanned aerial vehicle configured to maintain a persistent eye-in-the-sky over areas of interest for periods on the order of a week or more at altitudes at or above 65,000 feet. The embodiment includes an aircraft fuselage 101, an aircraft wing 103, an aircraft empennage 105 and a plurality of (e.g., four) wing-mounted electric motors 107. The aircraft empennage 105 includes a vertical stabilizer 111 and horizontal stabilizers 113, as well as elevators 115 and a rudder 117. These surfaces are mounted at the aft end of a substantially rigid, light-weight boom 119 extending back from the fuselage 101 to minimize weight while providing a significant moment arm for the empennage 105. Each motor 107 is provided with a propeller 121 to provide aircraft thrust.

The fuselage 101 is provided with a powerplant that generates electricity, and a complete fuel supply for the powerplant. More particularly, there are two fuel tanks 123, each containing liquid hydrogen, and a hydrogen engine 125 configured to burn hydrogen using atmospheric oxygen to produce electricity for the motors 107, flight systems and payloads to operate. Alternative embodiments may operate using other types of fuel, fuel cell technology, and/or other power sources such as solar power. The fuselage 101 is also provided with a pressurized avionics bay 127 for environmentally sensitive aircraft flight equipment such as computers, and a high-altitude EO/IR Imaging System 129. Such systems are commercially available.

The wing 103 is a large, relatively lightly loaded "dry" structure (i.e., no fuel is stored in the wing), and includes fly-by-wire ailerons 143. Other than the motors 107 and wing-mounted control surfaces (i.e., ailerons), the wing 103 primarily carries mission-specific equipment, such as antennas and associated RF electronics (not shown).

The aircraft wing 103 is made from five separate wing segments that form one wing-set of wing segments, including a center segment 131, an intermediate port segment 133, an outer port segment 135, an intermediate starboard segment 137 and an outer starboard segment 139. For the purposes of this patent, one wing-set is defined as an appropriate set to form one wing 103. Each outer segment 135, 139 is configured with ailerons 143, and is considered a wingtip wing segment. Two motors 107 are mounted on each intermediate segment 133, 137.

In this embodiment, each wing segment is usable only in its designated location. Nevertheless, generic wing segments capable of use as both intermediate and outer wing segments, and/or as both left and right wing segments are within the scope of the invention. Likewise, wings with greater numbers of segments, such as wings with two intermediate segments on each side, could allow further redundancy and configuration flexibility.

As depicted, the wing 103 is formed by one wing-set of wing segments that are longitudinally connected in series, each one spanning the full cord of the wing 103 throughout its portion of the wingspan. Nevertheless, it is within the scope of the invention to have wing segments be sub-segments that hang from other wing segments (e.g., wing segments that do not span the full chord of the wing 103, but instead share the wingspan of one or more other segments), or to have the wing be one large removable wing segment that is replaceable with another full-wing wing segment. It is also within the scope of the invention to have a single wing segment that can replace two or more wing segments, or vice versa. For example, a single wing segment of appropriate size and shape could replace a combination of the intermediate and outer wing segments. This would reduce structural weight when a larger volume of mission-specific equipment is needed on one side than can be held in one wing segment, or when no mission-specific equipment is needed on one side. In some cases, this could lead to configurations that are not symmetric from one side of the wing to the other.

The wing segments 131-139 are readily attachable to and detachable from one another and, directly or indirectly (via the center wing segment), to the aircraft fuselage 101. The attachment points between wing segments includes both structural connections 141 configured to carry all in-flight loads, and electrical connections (not shown in FIGS. 1-3) including power, fly-by-wire flight control and data connections (e.g., an Ethernet connection 341, see FIG. 11) configured to operate the motors 107, the ailerons, and all wing-mounted mission-specific equipment. While the wing segments may carry parts of an integrated aircraft (such as ailerons), they lack the complete set of equipment necessary for individual flight (without the fuselage 101), and rely on the fuselage 101 for flight command, control, and stability, as well as power (both motor power and power for mission specific equipment).

Some wing segments (i.e., mission-specific wing segments) are configured with mission-specific equipment, such as an electronically scanned antenna and related electronics. These wing segments typically also include computer-readable media carrying computer-readable data providing operational parameters pertaining to the operating requirements of the mission-specific wing segments.

As depicted, the wing segments of this embodiment have only limited dihedral, and that is principally on the outer wing segments. However, the wing segments and wing connection points are relatively flexible, and during flight these lightly constructed wing segments develop additional dihedral, particularly on the outer wing segments. For many missions, it may be preferable to use antennas that view partially to the side rather than straight down. This is particularly true for missions that cannot, or are otherwise not allowed to, fly over their target. For such missions, having the mission-specific equipment in the outer (wingtip) wing segments may be highly beneficial, as the sideways viewing angle may be significant, and highly preferred.

The center segment 131 can be permanently affixed to the fuselage 101, with only the intermediate and/or outer segments having replaceable mission-specific equipment. In that case, the center segment might not be dry. Indeed, while it would introduce complications with necessary fuel line connections and the related fuel management equipment, the removable wing segments may not be dry within the broadest scope of the invention. In the preferred embodiment, the center wing segment is detachable for transportation or storage, but does not contain mission-specific equipment.

Figure 7:
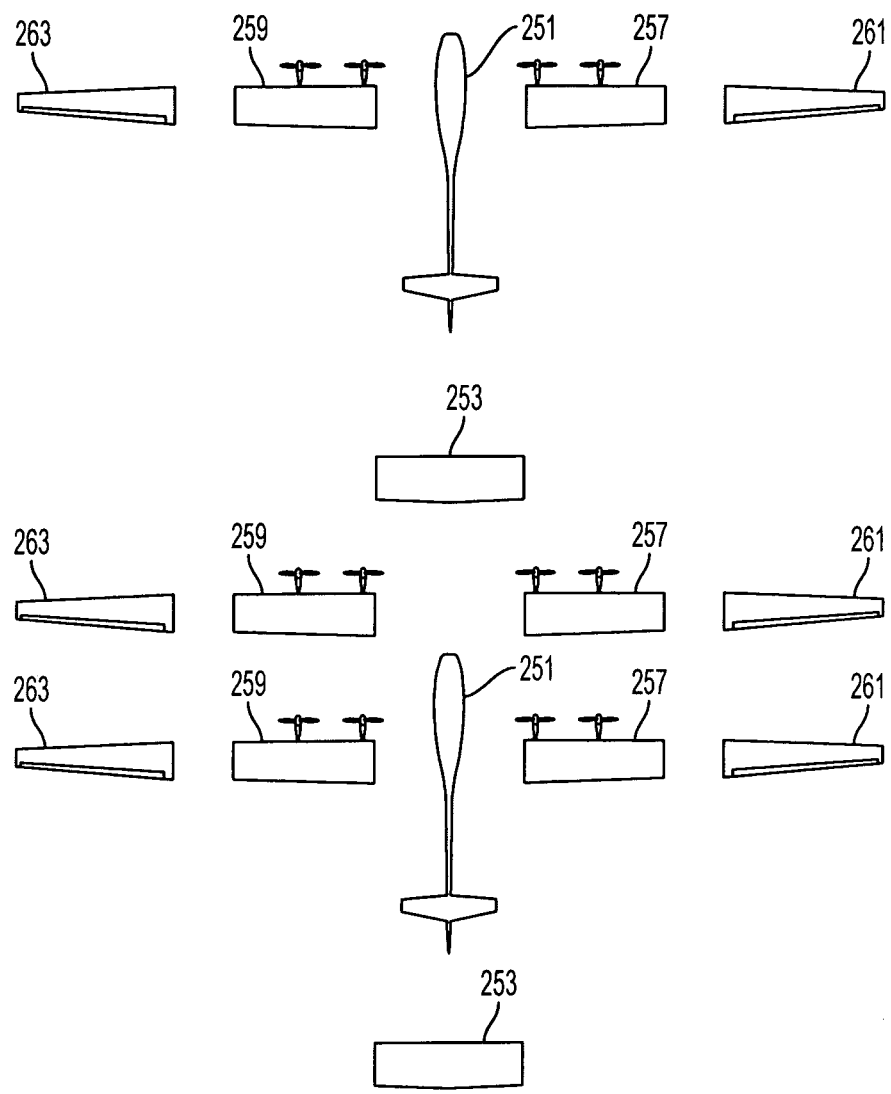

The aircraft 101 is provided with more wing segments than are usable at one time with the aircraft fuselage 101 (i.e., they have one wing-set plus at least one additional wing segment) (see, e.g., FIG. 7). At least two wing segments of the plurality of wing segments are interchangeable with one another, with one of the additional wing segments being one of them. For example, there can be two intermediate port wing segments. The two interchangeable wing segments may be configured with different mission-specific equipment from one another, they may be configured with identical mission-specific equipment, or one may contain mission-specific equipment while the other does not. Also, the two interchangeable wing segments may be configured with different aerodynamic shapes, e.g., differing airfoil shapes and/or chords (i.e., chord lengths), from one another to provide the flexibility for missions having different flight characteristics (e.g., a higher speed mission wing segment and a lower speed mission wing segment), or they may be configured with identical aerodynamic shapes.

Under one such configuration possibility, a first of the two interchangeable wing segments includes mission-specific equipment for a first mission-specific configuration, but not mission-specific equipment required only for a second mission-specific configuration (i.e., but not for the first mission-specific configuration). A second of the two wing segments, i.e., a replacement wing segment, includes mission-specific equipment for the second mission-specific configuration, but not mission-specific equipment required only for the first mission-specific configuration (i.e., but not for the second mission-specific configuration).

This combination of wing segments provides for the aircraft to be reconfigurable simply by disconnecting one of the two interchangeable wing segments from the remainder of the aircraft (e.g., the fuselage 101), and replacing the disconnected wing segment with the replacement wing segment. If an intermediate wing segment is to be replaced, either its respective outer wing segment must be removed and attached to the replacement wing segment, or the replacement must have its own outer wing segment.

Under another such configuration possibility, each of the two interchangeable wing segments includes mission-specific equipment for a single mission-specific configuration, such as one that may have sensitive equipment that may regularly require servicing, i.e., repair, maintenance or other adjustment. This configuration provides for the aircraft to be refitted with the replacement wing segment and promptly redeployed, without having to wait for the necessary servicing.

Under yet another such configuration possibility, one of the two interchangeable wing segments includes mission-specific equipment for a single mission-specific configuration, while the other does not. This configuration provides for the aircraft to sometimes be flown with the mission-specific equipment, and sometimes without the mission-specific equipment, such as on an aircraft that may sometimes simultaneously carry more than one set of mission-specific equipment.

And under yet another configuration possibility, the two interchangeable wing segments could have different airfoil shapes, where each airfoil is selected for mission-specific flight requirements. For example, one airfoil could be designed for fuel-efficient flight on low-speed missions while another could be designed for fuel-efficient flight on high-speed missions. These segments each might or might not have mission-specific equipment. Typically, such interchangeable wing segments will come in pairs (i.e., two pairs of interchangeable wing segments) so that each side of the wing can be modified using a wing segment having the same airfoil shapes.

For any of these configurations, the motor mounts may require significant structure, which may reduce the available space for mission-specific equipment in the intermediate wing segments. Additionally, because the intermediate wing segments carry the motors, either each interchangeable intermediate wing segment would need motors, or the motors would have to be moved onto the replaced wing segment with every replacement. Moreover, changing an intermediate wing segment inherently involves disconnecting or replacing the outer wing segments. These reasons, in combination with the previously discussed beneficial side-viewing properties of the outer wing segments, will typically make using the outer wing segments as the interchangeable wing segments preferred for many configurations.

Figure 4:
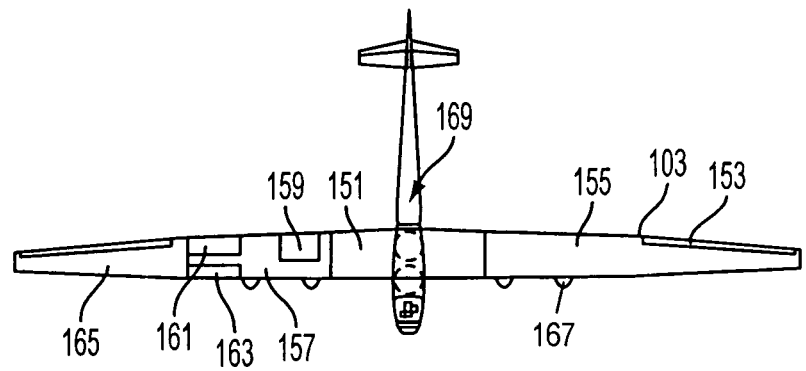
FIG. 4 is a top view of a variation of the aircraft depicted in FIG. 1.
Figure 5:
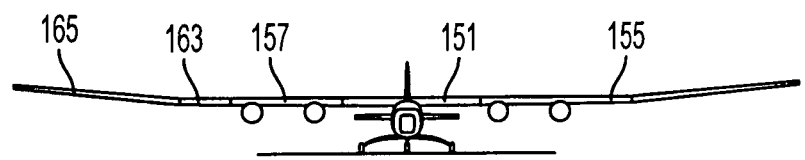
FIG. 5 is a front view of the aircraft depicted in FIG. 4.
Figure 6:
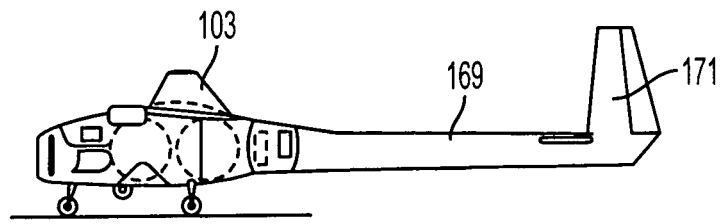
FIG. 6 is a side view of the aircraft depicted in FIG. 4.

In light of the above-noted variations, and with reference to FIGS. 4-6, in another embodiment, the wing 103 is a large, "wet" structure, having fuel stored in a center section 151, and includes fly-by-wire ailerons 153. The aircraft wing 103 is further made from six separate additional wing segments that form one wing-set of wing segments, including a port segment 155 that extends from the center segment to the outboard tip of the wing, an intermediate starboard segment 157, an aft-inboard sub-segment 159, an aft-outboard sub-segment 161, a forward-outboard sub-segment 163 laterally aligned with the aft-outboard sub-segment 161, and an outer starboard segment 165. Each outermost segment 155, 165 is configured with ailerons 153, and is considered a wingtip wing segment. Two motors 167 are mounted on the intermediate segments, which are the port segment 155 and the intermediate starboard segment, 157. The motors may drive a propeller or other fan-type device. A fuselage 169 and an empennage 171 are constructed under a typical aircraft design.

As is apparent in the figures, sub-segments might comprise only a portion of the wingspan, and can be wholly carried by another segment (e.g., the aft-inboard sub-segment 159 is wholly carried by the starboard intermediate segment). Each sub-segment can optionally be equipped with a payload of mission-specific equipment, and be configured to carry structural loads (e.g., the forward-outboard sub-segment 163 may be equipped to carry structural loads from the outer starboard segment 165).

Figure 8:
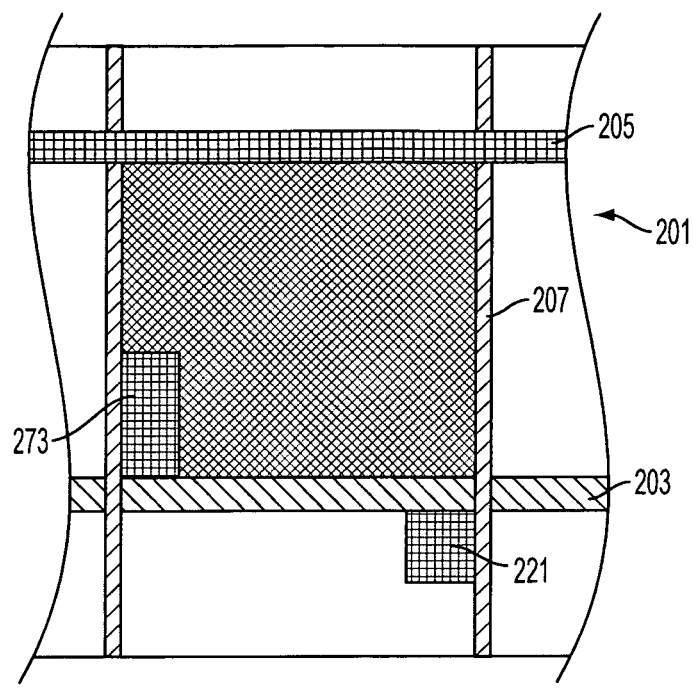
FIG. 8 is a top cross-section view of a portion of a wing segment from the aircraft depicted in FIG. 1.
Figure 9:
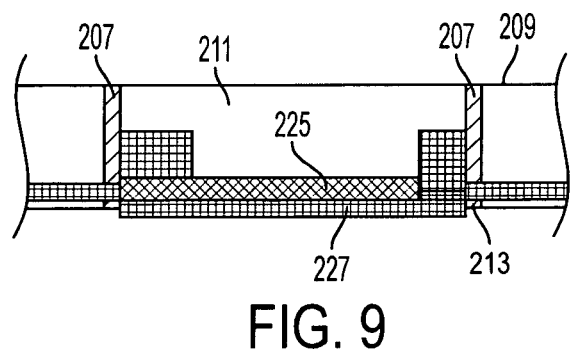
FIG. 9 is a front cross-section view of the wing segment portion depicted in FIG. 8.
Figure 10:
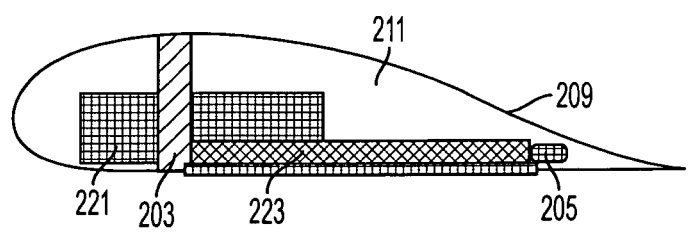
FIG. 10 is a side cross-section view of the wing segment portion depicted in FIG. 8.

With reference to FIGS. 8-10, each wing segment is manufactured with a generic, lightweight design capable of being customized for a wide variety of missions. Thus, the aircraft is configured with both structural and electronic connections between wing segments that can be used for a wide variety of mission-specific configurations. These connections are configured to be rapidly attached and unattached by field technicians operating with relatively rudimentary equipment. Therefore, the aircraft may be rapidly reconfigured on location with relatively little down time.

A typical wing segment 201 might include a primary spar 203, a secondary spar 205, a plurality of ribs 207, and a skin 209, as is known in the art of designing aircraft wings. The depicted spars are conceptual, and not drawn to scale. The spar and rib configuration is laid out to provide a plurality of equipment bays (i.e., structure-limited equipment locations) appropriate for carrying mission-specific equipment. To customize a wing, one or more of the plurality of equipment bays 211 is identified for carrying mission-specific equipment, and apertures 213 are built through the wing-segment skin to access the one or more equipment bays 211. The equipment is installed in the equipment bay 211, with the last installation typically being an antenna spanning the aperture, and a radome covering the antenna and conforming to the airfoil shape.

The mission specific equipment may include a variety of equipment, including I/O (input/output) devices including transmission devices (e.g., TV transmitters, radio transmitters, radar signal transmitters and the like), sensory devices (e.g., cameras for a variety of spectra, and electromagnetic receivers including a variety of antennas, and the like) and data management equipment (e.g., memory devices, data processing devices, mission control systems to adjust missions on a real-time basis, and the like). Advantageously, with the mission data stored in the wing segment, the data is automatically retrieved when the wing segment is swapped out with an interchangeable, flight-ready wing segment. Moreover, the wing structure can be used in place of much of the typical trays, racks and such that support the data management equipment in the prior art.

One exemplary mission-specific configuration might include a receiver-transmitter 221 forward of the main spar, beam-scanning electronics 223 aft of the main spar, an electronically scanned antenna 225 spanning from one rib to the next and from the primary spar to the secondary spar, and a radome 227 adjoining the electronically scanned antenna to provide protection. Many configurations will have antennas of one sort or another, and preferably each will have a radome that conforms to the outer shape of the airfoil, thereby preventing excess drag. Because the airfoil of the replacement panel can match that of the original panel, no additional parasitic drag (or at least no additional form drag) will generally result, and the total drag increase will be minimized. The beam-steering electronics and receiver-transmitter may be longitudinally spaced over the area of the aperture to spread the load out over the wing to minimize structural and structural-dynamic concerns.

Optionally, the aircraft can provide a high level of flexibility by offering different mission-specific equipment in different segments of the wing. For example, a synthetic aperture radar could be built into a port outer wing segment, while a communications relay package could be built into a starboard outer wing segment. The aircraft would likely further include both starboard and port outer wing segments that did not have the mission-specific equipment. With this combination, the aircraft could be configured and sent up for a mission requiring only a synthetic aperture radar (such as an electronics intelligence or signals intelligence mission), for a mission requiring only a communications relay package (such as support for ground forces), or for a mission requiring both. By configuring the aircraft with the minimum equipment necessary to conduct each mission, flight time can be maximized and both cost and fuel usage can be minimized.

Continuous Mission Aircraft System

Because the aircraft of this embodiment can be rapidly reconfigured or repaired and redeployed, it is well suited for use in a continuous mission aircraft system configured to conduct a continuous operational mission. More particularly with reference to FIG. 7, one embodiment of the system includes at least two of interchangeable aircraft sets, each including a fuselage and a wing-set of wing segments. Preferably, the system further includes additional wing segments. More particularly, this embodiment is provided with two fuselages 251, two center wing segments 253, three starboard intermediate wing segments 257, three port intermediate wing segments 259, three starboard outer wing segments 261, and three port outer wing segments 263. Thus, the plurality of wing segments includes at least two wing-sets, i.e., enough wing segments to form complete wings for two aircraft, and preferably a greater number. The wing segments include at least two and preferably three interchangeable wing segments for each position, each of the interchangeable wing segments being configured with the same type of mission-specific equipment for the operation mission (or lack thereof).

Configuration Controller

Figure 11:
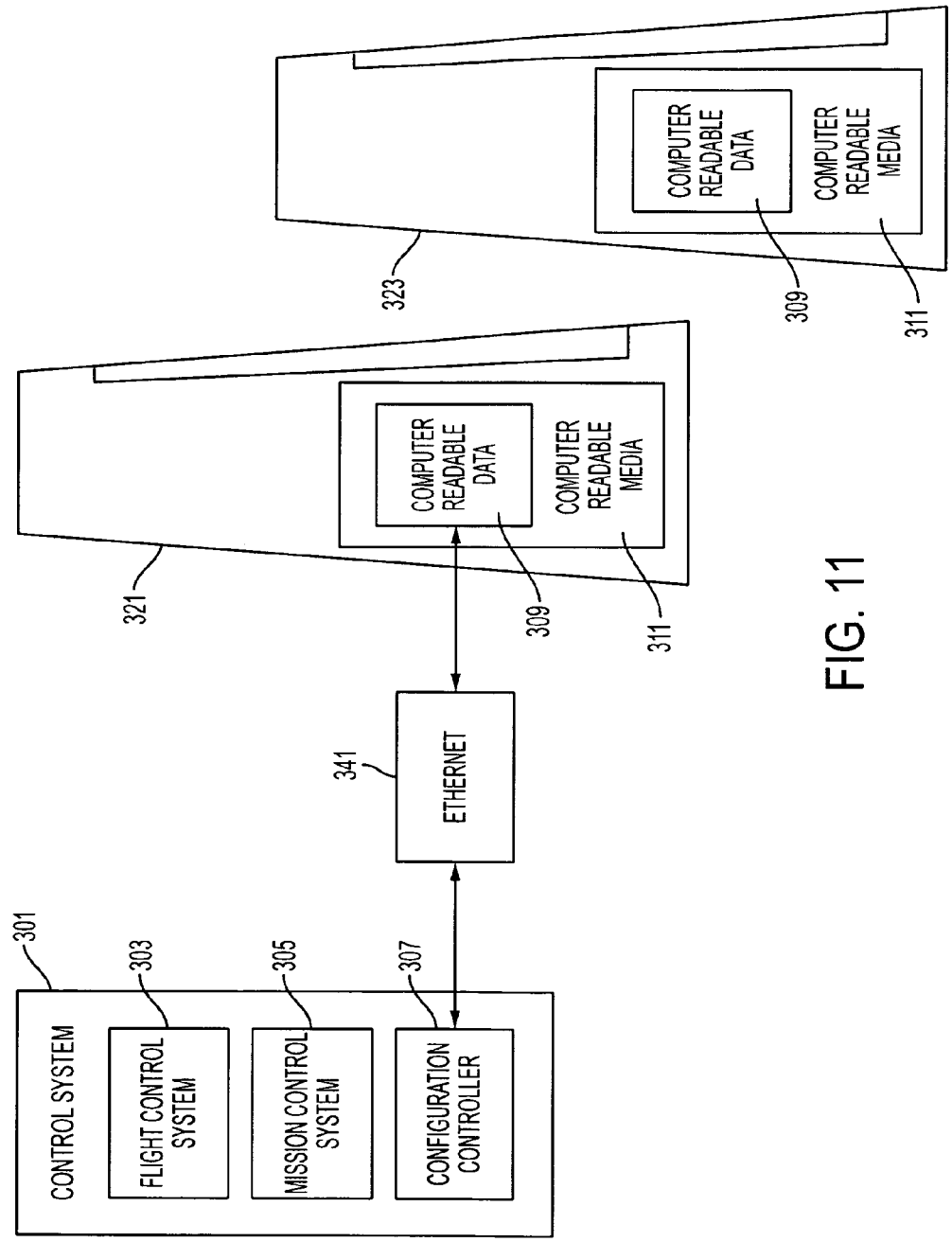
FIG. 11 is a system layout of a control system from the aircraft depicted in FIG. 1.

With reference to FIG. 11, the pressurized avionics bay 127 (see, FIG. 3) includes a control system 301 (e.g., a computer) configured with a flight control system 303 configured to operate the aircraft, a mission control system 305 configured to control how the mission is conducted, and a configuration controller 307 configured to program the flight control system 303 and mission control system 305 with appropriate operational parameters for the attached wing segments, including their related mission requirements. The control system configuration controller is configured to read computer-readable data 309 from computer-readable media 311 of the mission-specific wing segments via the Ethernet connections 341 (or other wiring or network architecture), and to supply the operational parameters to operate the aircraft in light of the computer-readable data.

For example, for a first mission-specific wing segment 321, (shown connected to the control system), the computer-readable data may include weight-and-balance information specific to the first wing segment, trim information specific to the first wing segment, autopilot gain information specific to the first wing segment, and flight requirements for the mission-specific equipment to conduct the mission using the first wing segment. For a second mission-specific wing segment 323 (shown not connected to the control system), the computer-readable data may include different weight-and-balance information specific to the second wing segment, trim information specific to the second wing segment, autopilot gain information specific to the second wing segment, and flight requirements for the mission-specific equipment to conduct the mission using the second wing segment. Use of the computer-readable data allows the aircraft to reconfigure its own programming automatically when a new wing segment is attached. Thus, wing segments may effectively be plug-and-play devices.

Optionally, the computer readable media in the wing segment could also include software necessary for the aircraft to conduct its mission. Nevertheless, it is not anticipated that providing the aircraft with software for a variety of missions will add significantly to the aircraft weight, and thus it is anticipated that each fuselage 101 will typically have storage devices provided with software for a wide array of missions. Optionally, the configuration controller could have operational parameters for a plurality of different mission-specific wing-segment types. In that case, the computer readable media in the wing segment may be provided with computer-readable data identifying the type of wing segment and/or mission so that the configuration controller can deliver the appropriate operational parameters to the flight and mission controllers.

Thus, another embodiment of the invention may be found in a wing segment system for a reconfigurable aircraft system having an aircraft fuselage and a plurality of wing segments. The wing segment system includes a mission-specific wing segment configured with a connection system to be readily attachable and detachable from the aircraft fuselage, with mission-specific equipment, and with computer-readable media containing information identifying operational parameters pertaining to the operating requirements of the mission-specific wing segment. It would also include wing segments having no mission-specific equipment, but still having computer-readable data media having information indicating that the wing segment has no mission-specific equipment. This information provides the aircraft the ability to verify that all attached wing segments are available, and to avoid errors in which a bad connection makes a mission-specific wing segment appear to be a wing segment without mission-specific equipment.

Finally, another embodiment may be found in a fuselage configured for use with a wing segment system for a reconfigurable aircraft system. The fuselage contains a controller configured to read computer-readable media from one or more of the wing segments, the computer readable media containing information identifying operational parameters pertaining to the operating requirements of the wing segment.

The control system is further configured to provide flight control and mission control based on the data read from the computer readable media.

Methods

Figure 12:
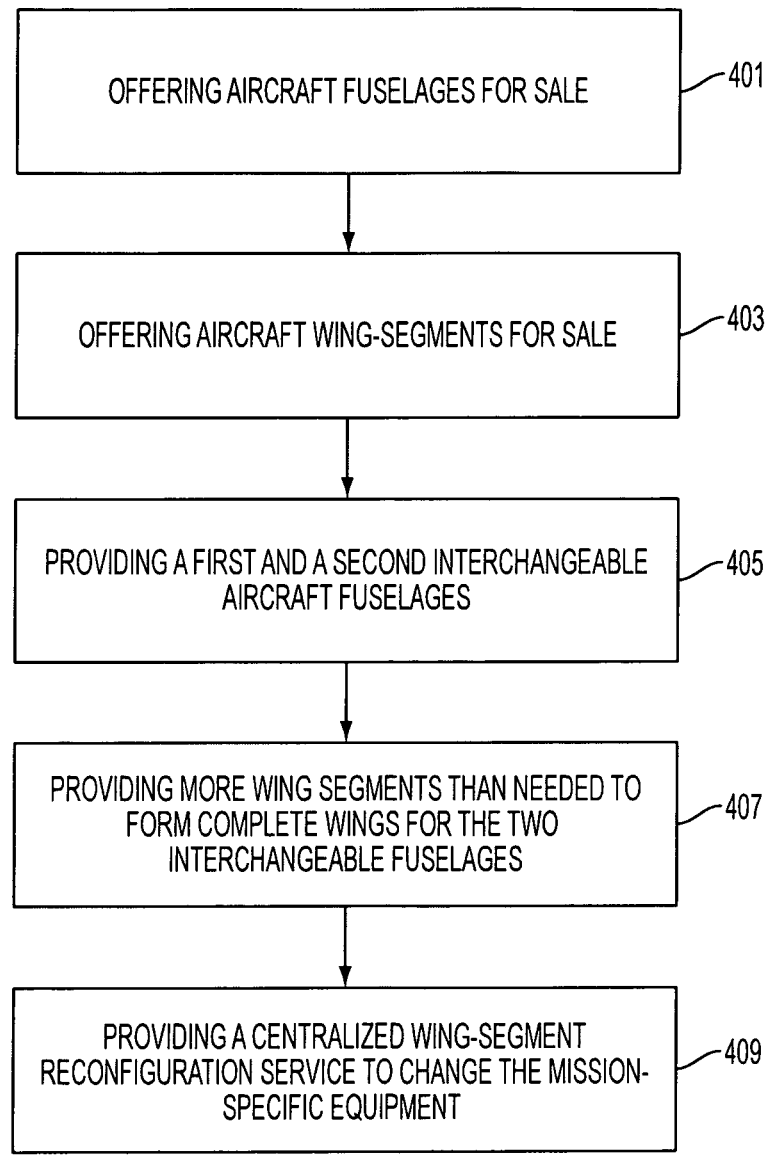
FIG. 12 is a flow chart of a method for providing a continuous aircraft system.
Figure 13:
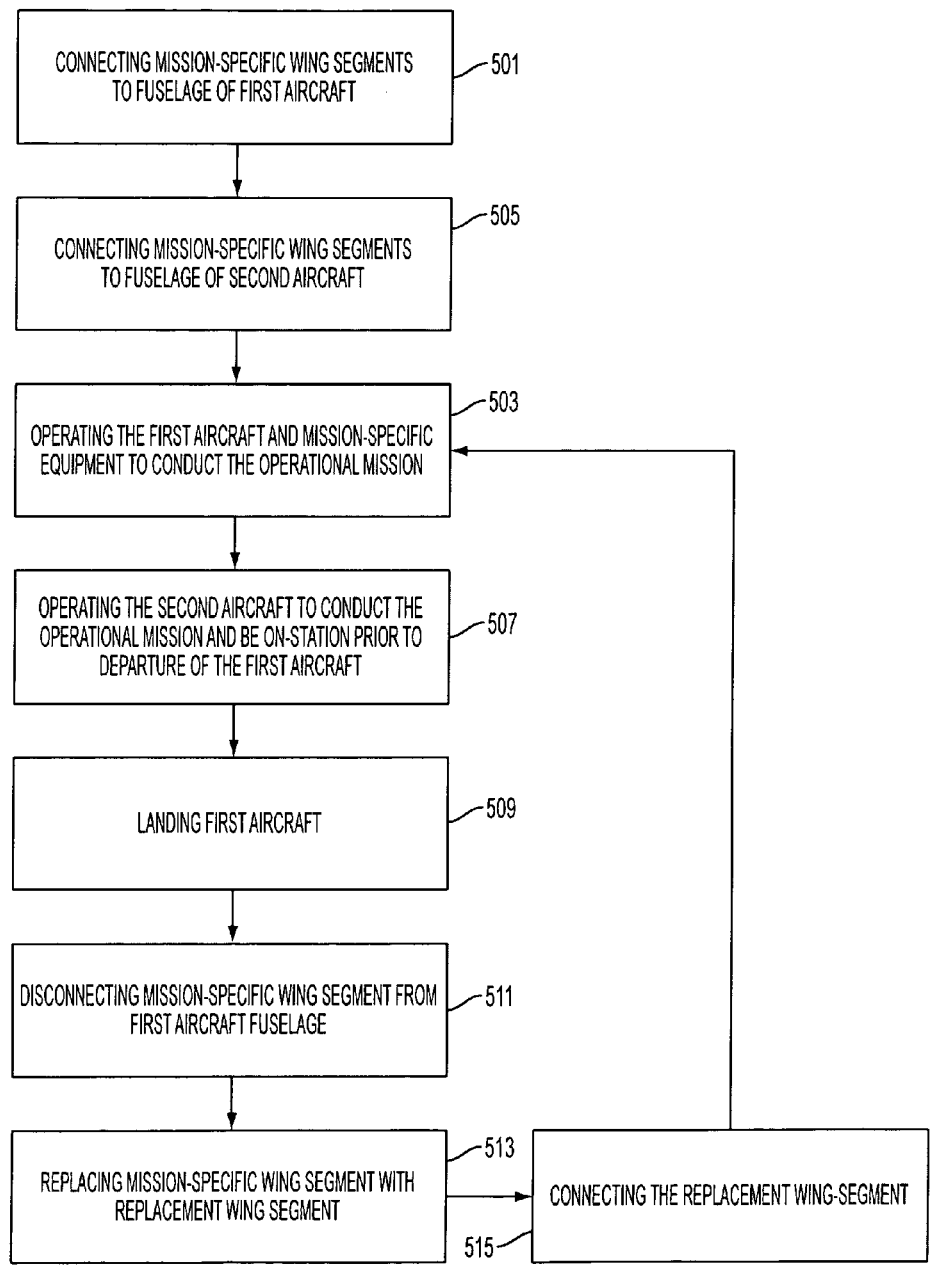
FIG. 13 is a flow chart of a method for operating a continuous aircraft system.

With reference to FIGS. 12 and 13, unlike traditional aircraft, which are either purchased in a generic form or purchased as a custom-built product, the present invention is modular in nature, and can be sold in a fashion not previously contemplated for aircraft sales. In particular, under a method of marketing an aircraft that is configurable for a plurality of different operational missions, a seller may offer for sale an aircraft fuselage 401 configured to detachably receive one or more aircraft wing segments. Separately, a seller may offer for sale one or more wing segments 403 that can form a complete wing-set for the aircraft fuselage. The one or more wing segments include a plurality of interchangeable wing segments, at least some of which are configured with a different type of mission-specific equipment, wherein each type of mission-specific equipment is appropriate for one of the different operational missions.

Advantageously, this aircraft can be used in an aircraft system that provides for a continuous mission to be performed with high reliability and/or significantly reduced costs. More particularly, using this system at least one aircraft can be kept on-station (i.e., on location or on a planned flight path) at all times.

More particularly, a first and a second fuselage are purchased and provided to the purchaser 405 of the aircraft system. Likewise, a plurality of wing segments are purchased and provided to the purchaser 407. This plurality includes enough wing segments for two complete wings (i.e., there are two wing-sets of wing segments), and further includes at least one extra wing segment. The extra wing segment is interchangeable with at least one wing segment from each wing-set to form a redundant subset of at least three interchangeable wing segments configured with mission-specific equipment of a given type.

The first wing-set of wing segments is assembled and connected 501 to the first fuselage to form a first aircraft including one of the interchangeable wing segments. Likewise, the second wing-set of wing segments is assembled and connected 505 to the second fuselage to form a second aircraft including one of the interchangeable wing segments. One of the interchangeable wing segments remains presently unused. The first aircraft is launched and operated 503 under the mission parameters to conduct the operational mission, i.e., it is launched and flown to its designated station and the mission-specific equipment is used for its intended purpose.

When the first aircraft is nearing the end of its flight duration, the second aircraft is flown up to replace it. More particularly, the second aircraft is operated 507 under the mission parameters to conduct the operational mission. The launch of the second aircraft is timed for the newly launched aircraft to arrive on-station prior to the departure of the other aircraft. Once the newly launched, second aircraft is on-station, the first aircraft, which was flying when the newly launched aircraft was launched, is then returned to the ground and landed 509. The first, landed aircraft is inspected, refueled, and prepared for flight. If the mission-specific equipment of the landed aircraft needs servicing, then the interchangeable wing segment of the landed aircraft is rapidly disconnected 511 and replaced 513 with the presently unused interchangeable wing segment.

Typically this replacement wing segment has the same mission-specific equipment as the wing segment it replaced. The replaced wing segment can then be serviced without interfering with the flight schedule of the first aircraft. Thus, repairs, maintenance or other adjustment of the mission-specific equipment can be done without interrupting the continuity of the mission.

The replacement wing segment is connected 515 to the aircraft fuselage in place of the replaced wing segment. Then, when the aircraft that is now flying is nearing the end of its flight duration, the landed aircraft can again be launched and operated 503 to replace the now-flying aircraft. So long as the wing segments can be serviced before another wing segment needs replacement, this cycle can be repeated endlessly.

Optionally, an embodiment of an aircraft under the invention may include an extra fuselage, optionally along with at least one wing-set of wing segments. If one fuselage requires repair, the second fuselage can receive the mission-specific wing segment(s), and possibly all the wing segments from the first fuselage, thus providing coverage for the mission despite the need for repairs on a fuselage.

Additionally, an embodiment of an aircraft under the invention can be rapidly upgraded to a new mission that requires new mission-specific equipment by simply providing a new set of one or more mission-specific wing segments and/or by providing a service to change out the mission-specific equipment of a wing segment. This process includes disconnecting, replacing and connecting the mission-specific wing segment on a first of the aircraft to be upgraded. For a continuous mission having two aircraft, one aircraft is upgraded first, and then flown to station. The second aircraft is then landed after the first is on-station, and similarly upgraded (i.e., the mission specific wing-segment is disconnected, replaced and connected).

Part of the method of providing such an aircraft system may include the providing of a centralized wing-segment reconfiguration service 409 that can change the mission-specific equipment configuration of presently unused wing segments while the continuous mission aircraft system continues to operate.

Common among these different variations are the steps (in various orders) of: landing an aircraft, disconnecting one or more wing segments from the fuselage of that aircraft, including one or more mission-specific wing segments, replacing the wing segments and/or the fuselage, assembling the aircraft including both replaced portions and not-replaced portions, and flying reassembled aircraft to station.

It is to be understood that the invention comprises apparatus and methods for designing and producing aircraft, as well as the apparatus and methods of the aircraft system itself. The above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A configurable aircraft, comprising:
an aircraft fuselage; and
a plurality of wing segments;
wherein the plurality of wing segments are readily attachable and detachable from the aircraft fuselage to form a wing;

wherein the plurality of wing segments includes one wing-set of wing segments and at least one additional wing segment;
wherein at least two of the plurality of wing segments are interchangeable with one another;
wherein at least one of the at least two interchangeable wing segments includes mission-specific equipment;
the wing segments that have mission-specific equipment also include a computer-readable medium carrying computer-readable data configured to provide operational parameter information pertaining to the mission-specific wing segments; and
the fuselage includes a control system configured to read the computer-readable data from the computer-readable medium of the wing segments that have mission-specific wing equipment, and to use the operational parameters in determining the operation of the aircraft.

2. The configurable aircraft of claim 1, wherein the wing is formed by a longitudinal series of wing segments.

3. The configurable aircraft of claim 2, wherein the interchangeable wing segments are each configured to operate as an outboard-most wing segment.

4. The configurable aircraft of claim 1, wherein the interchangeable wing segments each include mission-specific equipment configured to perform the same function.

5. The configurable aircraft of claim 1, wherein each interchangeable wing segment is configured with mission-specific equipment that is functionally different from the mission-specific equipment of other interchangeable wing segments.

6. The configurable aircraft of claim 1, wherein each interchangeable wing segment is configured with the same mission-specific equipment.

7. The configurable aircraft of claim 1, wherein the computer-readable data of a given wing segment includes at least one parameter type selected from the group consisting of: weight-and-balance information specific to the wing segment, trim information specific to the wing segment, and autopilot gain information.

8. The configurable aircraft of claim 1, wherein:
the fuselage contains a power plant that generates electricity and a fuel supply for the power plant; and
at least one of the wing segments having at least one electric motor and a propeller capable of providing thrust using the electricity from the power plant.

9. A continuous mission aircraft system for conducting an operational mission, comprising:
a first aircraft in the form of the configurable aircraft of claim 1; and
a second aircraft fuselage that is interchangeable with the first aircraft fuselage;
wherein the plurality of wing segments includes two wing-sets of wing segments and at least one additional wing segment;
wherein the plurality of wing segments includes three interchangeable wing segments, each of the interchangeable wing segments being configured with mission-specific equipment operative for conducting the operational mission.

10. A wing segment system for a configurable aircraft system having an aircraft fuselage and a plurality of wing segments, comprising:
a wing segment configured to be readily attachable and detachable from the aircraft fuselage;
wherein the mission-specific wing segment includes computer-readable media containing information identifying operational parameters pertaining to the operating requirements of the wing segment.

11. The wing segment system of claim 10, wherein the wing segment is a mission-specific wing segment configured with mission-specific equipment, and wherein the wing segment computer-readable media contains information identifying operational parameters pertaining to the operating requirements for a mission-specific wing segment.

12. The wing segment system of claim 10, wherein the wing segment carries no mission-specific equipment, and wherein the wing segment computer-readable media contains information identifying that the wing segment carries no mission-specific equipment.

13. The wing segment system of claim 10, wherein the computer-readable data of a given wing segment provides at least one parameter type selected from the group consisting of: weight-and-balance information specific to the wing segment, trim information specific to the wing segment, and autopilot gain information.

14. A fuselage system for a configurable aircraft system having a plurality of wing segments, comprising:
a fuselage configured to be readily attachable and detachable from the plurality of wing segments;
wherein the fuselage includes a control system configured to read computer-readable media from one or more of the wing segments, the computer readable media containing information identifying operational parameters pertaining to the operating requirements of the wing segment; and
wherein the fuselage control system is further configured to provide flight control and mission control based on the data read from the computer readable media.

* * * * *